United States Patent [19]
Martyashin et al.

[11] 3,846,699
[45] Nov. 5, 1974

[54] METHOD AND DEVICE FOR MEASURING PARAMETERS OF RESONANT LC CIRCUIT ELEMENTS

[76] Inventors: Alexandr Ivanovich Martyashin, ulitsa Kirova, 69, kv. 59; Andrei Elizarovich Morozov, ulitsa Uritskogo, 44/10, kv. 62; Eduard Konstantinovich Shakhov, ulitsa Gladkova, 13, kv. 5; Viktor Mikhailovich Shlyandin, ulitsa Lermontova 12, kv. 17, all of Penza, U.S.S.R.

[22] Filed: July 16, 1973

[21] Appl. No.: 379,728

[52] U.S. Cl............................................. 324/57 R
[51] Int. Cl............................................. G01r 27/00
[58] Field of Search .................................. 324/57 R

[56] References Cited
UNITED STATES PATENTS

| | | | |
|---|---|---|---|
| 2,577,592 | 12/1951 | Shiepe.............................. | 324/57 R |
| 2,604,511 | 7/1952 | Marzolf............................. | 324/57 R |
| 2,626,981 | 1/1953 | Shiepe.............................. | 324/57 R |
| 3,017,571 | 1/1962 | Moricca et al................. | 324/57 R X |
| 3,432,752 | 3/1969 | Frederickson et al. ........... | 324/57 R |
| 3,480,857 | 11/1969 | Bialko et al....................... | 324/57 R |
| 3,624,494 | 11/1971 | Turan............................... | 324/57 R |

*Primary Examiner*—Stanley T. Krawczewicz
*Attorney, Agent, or Firm*—Eric H. Waters

[57] ABSTRACT

A method for measuring the parameters of elements in a resonant LC circuit wherein a linearly varying voltage or current is applied to a resonant LC circuit, a calibrated time interval is set at the end of which the voltage or current that has been previously applied is cut off, and a linearly varying voltage of a reversed polarity or current of an opposite direction is applied instead. Then, as soon as the current or voltage in the resonant LC circuit becomes zero, the linearly varying voltage or current is interrupted and the current or voltage taken off the resonant LC circuit after the interruption is measured. After that, D.C. voltage or direct current is fed to the resonant LC circuit, the current or voltage in the resonant LC circuit is compared with two reference currents or voltages, and the time interval is measured between the instants at which the current flowing through the LC circuit alternately equals said reference currents or at which the voltage taken off the LC circuit alternately equals the reference voltages. The magnitudes of the measured current and time interval give the parameters of the resonant LC circuit.

A device for effecting the proposed method comprises a switch with the first input thereof connected to a source of a linearly varying voltage, a second input connected to a source of a linearly varying voltage of a reversed polarity, and a third input coupled to a D.C. voltage source. The switch is coupled through the resonant LC circuit or a reference element to a D.C. amplifier employing parallel negative feedback connected to a voltage measuring unit and a comparator unit. The comparator unit, in turn, is connected to a source of reference voltages and also to a control unit and a voltage measuring unit. When the output voltage of the D.C. amplifier becomes equal, respectively, to zero and each of the two reference voltages, the comparator unit delivers these signals to the voltage measuring unit and the control unit. The control unit controls the time interval measuring unit so that the beginning of the time interval being measured coincides in time with the second signal from the comparator unit and the end of the time interval, with the third signal. When the first signal from the comparator unit is applied, the voltage measuring unit starts measuring the voltage across the output of the D.C. amplifier.

6 Claims, 3 Drawing Figures

METHOD AND DEVICE FOR MEASURING PARAMETERS OF RESONANT LC CIRCUIT ELEMENTS

The present invention relates to electric measuring apparatus, and more particularly to a method and device for measuring the parameters of elements in a resonant LC circuit.

The proposed method for measuring the parameters of elements in a resonant LC circuit and a device for effecting same are predominantly used for measuring the parameters of elements in the resonant LC circuits of various radioelectronic devices and are also suitable for measuring signals from LC transducers and microsensors.

No similar methods or devices for measuring the parameters of elements in a resonant LC circuit are known.

An object of this invention is to provide a method and a device for measuring the parameters of elements in a resonant LC circuit wherein by applying desired electrical effects to an electric measuring circuit comprising a resonant LC circuit, the parameters of these resonant LC circuit elements could be measured in a comparatively short time and with a sufficiently high degree of accuracy.

This object is attained by that in a method for measuring the parameters of resonant LC circuit elements, a linearly varying voltage is applied, according to the invention, to a resonant LC circuit if the circuit elements are parallel-connected, or a linearly varying current is applied thereto if its elements are series-connected, a calibrated time interval is set after the termination of which the linearly varying voltage or current that had been previously applied thereto is interrupted and a linearly varying voltage of a reversed polarity or a linearly varying current of an opposite direction is applied instead, then the linearly varying voltage or current is cut off at the instant when the current through the parallel-connected LC elements or the voltage taken off the series-placed LC elements becomes almost nil, and the current flowing through the parallel connected LC elements or the voltage taken off the series-connected LC elements is measured after this cut-off, whereupon D.C. voltage or direct current is applied to the parallel- or series-connected LC elements, respectively, the current passing through the parallel-placed LC elements or voltage taken off the series-placed LC elements is compared with two reference currents or voltages, and the time interval is measured between the instants at which the current flowing through the parallel-connected LC elements alternately equals each of said two currents or at which the voltage taken off the series-connected LC elements alternately equals each of said two reference voltages, the magnitudes of the current and time interval or of the voltage and time interval being used for determining the parameters of the resonant LC circuit elements.

This object is also attained by that in a device for measuring the parameters of elements in a resonant LC circuit in accordance with the present invention, a switch, with its first input connected to a source of a linearly varying voltage adapted to be turned on by an external signal, second input connected to a source of a linearly varying voltage of a reversed polarity adapted to be turned on at the end of a calibrated time interval, third input connected to a D.C. voltage source and fourth input earthed, is coupled via the resonant LC circuit or a reference element to the input of a D.C. amplifier employing parallel negative feedback with the output thereof being connected to the input of a voltage measuring unit and one input of a comparator unit, the other input of the comparator unit being coupled to the output of a reference voltage source and the output, to a control unit and to the input of a voltage measuring unit, the comparator unit gives out three signals at the instants when the output voltage of the D.C. amplifier alternately equals zero and each of the two reference voltages, the three signals being applied to the voltage measuring unit and the control unit which controls the time interval measuring unit so that the beginning of the measured time interval coincides with the second signal from the comparator unit and the end, with the third signal from the comparator unit, the control unit also changes the state of the switch in such a way that at the moment of the arrival of an external signal, the switch output is connected to its first input, after a calibrated time interval elapsing from the arrival of an external signal, the switch output is connected to its second input, when the first signal arrives from the comparator unit, the switch output is connected to its fourth input, and the voltage measuring unit starts to measure the voltage across the output of the D.C. amplifier, whereupon the switch output becomes connected to its third input.

Preferably, the device should be so designed that when a resonant LC circuit comprises parallel-placed LC elements, a resistor is included in the parallel negative feedback circuit of the D.C. amplifier.

It is most advantageous that the device be so designed that when the resonant LC circuit consists of series-placed LC elements the latter elements are connected into the parallel negative feedback circuit of the D.C. amplifier, and a resistor is used as a reference element.

The proposed method and device for measuring the parameters of elements in a resonant LC circuit permit of measuring these parameters within a short time period and with a high degree of accuracy.

The invention can be more fully understood from the following description of preferred embodiments thereof when read with reference to the accompanying drawings, wherein.

Figure 1:
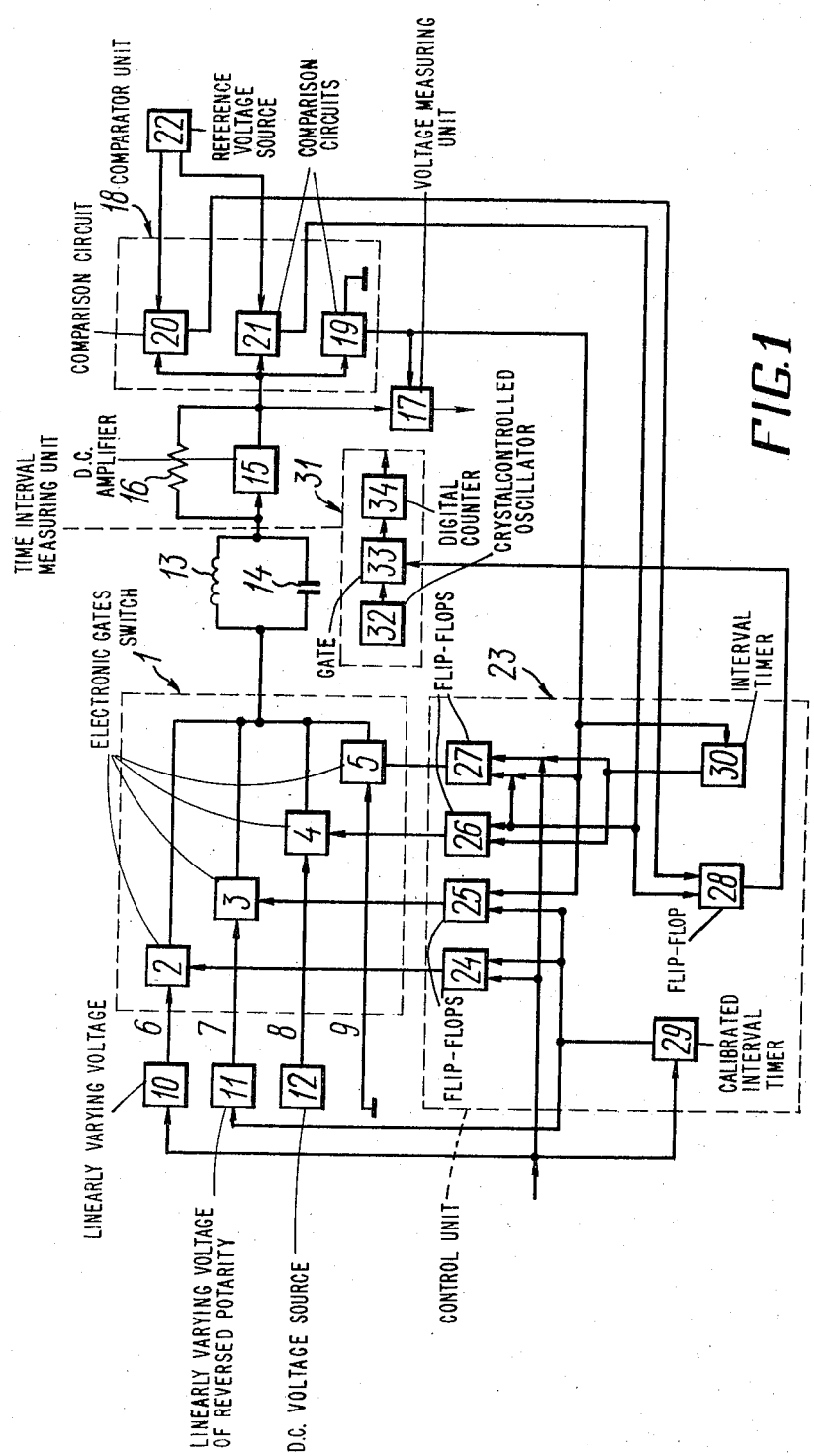
FIG. 1 is a functional diagram of one embodiment of a device for measuring the parameters of elements in a resonant LC circuit.

The proposed device for measuring the parameters of resonant LC circuit elements comprises a switch 1 (FIG. 1) composed of electronic gates 2, 3, 4 and 5, each using a transistor. A first input 6 of the switch I is the input of the gate 2, a second input 7 of the switch I is the input of the gate 3, a third input 8 of the switch I is the input of the gate 4, a fourth input of the switch I is the input of the gate 5, and the output of the switch I consists of the interconnected outputs of the gates 2, 3, 4 and 5. The first input 6 of the switch I is connected to the output of a linearly varying voltage source 10 the input whereof receives a signal from an external source (not shown), the second input 7 of the switch 1 is coupled to the output of a source 11 producing a linearly varying voltage of a reversed polarity, the third input 8 of the switch 1 is connected to the output of a D.C. voltage source 12, and the fourth input 9 of the switch 1 is earthed.

The linearly varying voltage sources 10 and 11 are known circuits employing an integrating D.C. amplifier, the D.C. voltage source 12 is a conventional semiconductor circuit.

The output of the switch 1 is connected through a resonant LC circuit, which in this embodiment of the device comprises an induction coil 13 in parallel relation with a capacitor 14, to the input of a D.C. amplifier 15 whose parallel negative feedback circuit in this embodiment incorporates a resistor 16. The output of the D.C. amplifier 15 is connected to the input of a voltage measuring unit 17 which is a digital voltmeter built around semiconductors arranged in a conventional circuit, and to the input of a comparator unit 18 comprising comparison circuits 19, 20 and 21. The D.C. amplifier 15 and the comparison circuits 19, 20 and 21 are built around an integrated circuit chip. Each comparison circuit 19, 20 and 21 has two inputs, one being coupled to respective inputs of the other two and to the output of the D.C. amplifier 15. The other input of the comparison circuit 19 is earthed, while the other inputs of the comparison circuits 20 and 21 are connected to respective outputs of a reference voltage source 22 which is a known semiconductor circuit. The output of the comparison circuit 19 is connected to the input of the voltage measuring unit 17.

The device also includes a control unit 23 having flip-flops 24, 25, 26, 27 and 28, a calibrated interval timer 29, and an interval timer 30. In this embodiment of the device, the timers 29 and 30 are triggered multivibrators known per se. The output of the calibrated interval timer 29 is connected to the 0 input of the flip-flop 24 and the 1 input of the flip-flop 25. The interval timer 30 has its output connected to the 1 input of the flip-flop 26 and the 0 input of the flip-flop 27. An externally-derived signal is applied to the calibrated interval timer 29, 1 input of the flip-flop 24 and 0 input of the flip-flop 27. The input of the interval timer 30, 0 input of the flip-flop 25 and the 1 input of the flip-flop 27 are connected to the output of the comparison circuit 19; the O input of the flip-flop 26, 1 input of the flip-flop 27 and O input of the flip-flop 28 are coupled to the input of the comparison circuit 21, and the 1 input of the flip-flop 28 is connected to the output of the comparison circuit 20. The outputs of the flip-flops 24, 25, 26 and 27 are connected, respectively, to the control inputs of the gates 2, 3, 4 and 5, while the output of the calibrated interval timer is coupled to the input of the linearly varying voltage source II.

The device also comprises a time interval measuring unit 31 with a crystal-controlled oscillator 32 which is a known semiconductor circuit, a gate 33 similar to the gates 2, 3, 4 and 5, and a digital counter 34, an HF pulse decimal counter of a conventional design. The output of the oscillator 32 is connected to the input of the gate 33 which has its output coupled to the input of the digital counter 34. The control input of the gate 33 and the output of the flip-flop 28 are interconnected.

The device for measuring the parameters of elements in a resonant LC circuit can also be carried into effect in another embodiment similar to the one described above.

This another embodiment differs from the above described in that its resonant LC circuit is formed of an inductance coil 35 (FIG. 2) in series with a capacitor 36 connected in the same way as the resistor 16 (FIG. 1). The reference element is a resistor 37 (FIG. 2) connected in a circuit similar to the parallel-placed inductance coil 13 (FIG. 1) and the capacitor 14.

The proposed device for measuring the parameters of elements in a resonant LC circuit operates as follows.

A signal from an external source arrives to the 1 input of the flip-flop 24 (FIG. 1) and the O input of the flip-flop 27 in the control unit 33, setting these inputs into the O and 1 states, respectively. The potential taken off the output of the flip-flop 24 triggers into conduction the gate 2 of the switch 1, whereas the potential from the output of the flip-flop 27 cuts off the gate 5. As a result, a linearly varying voltages $-kt$ ($k$ is the slope of the linearly varying voltage) is applied from the linearly varying voltage source 10 actuated by an external signal through the conducting gate 2 to the resonant LC circuit made up of the inductance coil 13 connected in parallel with the capacitor 14.

Figure 3:
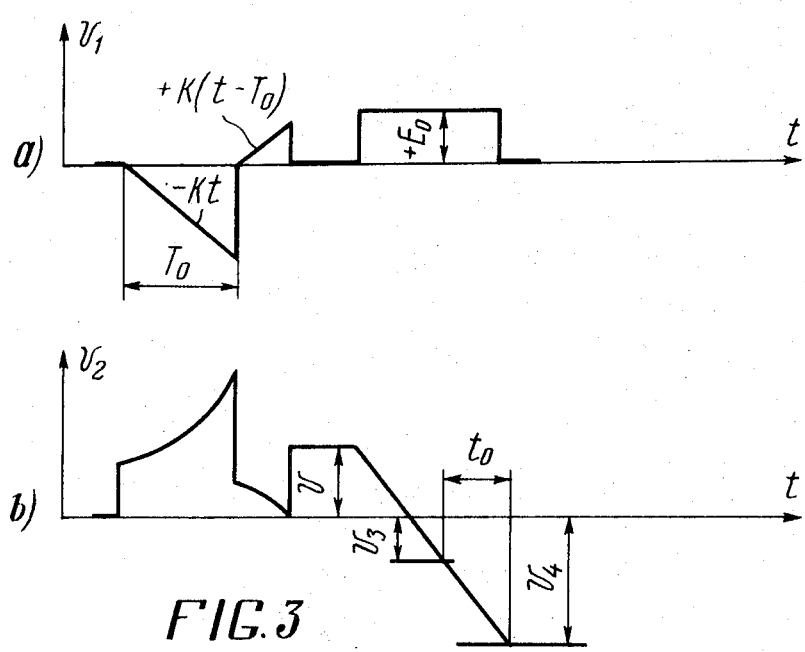
FIG. 3 illustrates timing charts a and b of voltages $U_1$ and $U_2$ across the switch output and the output of a D.C. amplifier, respectively.

In order that the method for measuring the parameters of resonant LC circuit elements be more readily understood, FIG. 3 shows timing charts $a$ and $b$ in which the abcissa represents the time, and the ordinate gives voltages $U_1$ and $U_2$ across the switch output and the output of the D.C. amplifier, respectively. The voltage $-kt$ is shown in timing chart $a$.

The inductance coil 13 and the capacitor 14 connected in parallel start to conduct current which comes to the input of the D.C. amplifier 15 with the parallel negative feedback circuit thereof including the resistor 16 having a resistance $R_o$. The voltage $U_2$ (FIG. 3, chart b) across the output of the amplifier 15 varies in direct proportion to the resistance $R_o$ and the current flowing through the resonant LC circuit.

An externally derived signal also actuates the calibrated interval timer 29 which sets a calibrated time interval $T_o$ (FIG. 3, chart a) $/T_o > \sqrt{2LC}/$ and after its termination generates a signal starting the source II of the linearly varying voltage of a reversed polarity, resetting the flip-flop 24 to O and the flip-flop 25 to I. The gate 2 is rendered non-conducting and the gate 3 starts to conduct, with the result that the linearly varying voltage $+k(t - T_o)$ (FIG. 3, chart a) of a reversed polarity is impressed through the conducting gate 3 on the resonant LC circuit. The current flowing through the LC circuit and, consequently, the voltage $U_1$ (FIG. 3, chart b) across the output of the D.C. amplifier 15 (FIG. 1) begin to diminish. As soon as this curent comes down almost to zero, the comparison circuit 19 of the comparator unit 18 is actuated to compare the output voltage of the D.C. amplifier 15 with the zero voltage level. The output of the comparison circuit 19 switches on the interval timer 30, resets the flip-flop 25 to the zero state and drives the flip-flop 27 into the I state. The gate 3 ceases to conduct, whereas the gate 5 is rendered conducting due to which the inductance coil 13 and the capacitor 14 connected in parallel relation are disconnected from the linearly varying voltage source 11 and coupled to the earthed fourth input 9 of the switch 1. This causes the current passing through the resonant LC circuit to abruptly change, then remain practically constant for the time period required for its measurement. The output of the comparison circuit 19 also goes to the input of the voltage measuring unit 17 making the latter start to measure the output voltage U (FIG. 3, charb b) of the D.C. amplifier proportional to the current through the resonant LC circuit.

After the time interval required for the voltage measuring unit 17 to complete operation is over, the interval timer 30 operates and its output drives the flip-flop 26 into the I state and the flip-flop 27 into the O state. The gate 4 begins to conduct and the gate 5 is cut off with the result that a D.C. voltage $+E_o$ (FIG. 3, chart a) is applied from the D.C. voltage source 12 (FIG. 1) via the conducting gate 4 to the resonant LC circuit. The current passing through the inductance coil 13 placed in parallel with the capacitor 14 and the output voltage $U_2$ (FIG. 3, chart b) of the D.C. amplifier 15 proportional thereto start to change in a linear fashion. The comparison circuits 20 and 21 compare the output voltage of the D.C. amplifier 15 with two reference voltages $U_3$ and $U_4$ ($U_4 < U_3 < U$). As soon as the output voltage of the D.C. amplifier 15 becomes equal to the reference voltage $U_3$ coming to the input of the comparison circuit 20 from the reference voltage source 22, the comparison circuit 20 operates and its output signal sets the flip-flop 28 to I. The gate 33 of the time interval measuring unit 31 is rendered conducting and the crystal-controlled oscillator 32 sends pulses through the conducting gate 33 to the input of the digital counter 34. The counter 34 starts measuring a time interval $t_o$ (FIG. 3, chart b). When the voltage output of the D.C. amplifir 15 becomes equal to the reference voltage $U_4$ applied to the input of the comparison circuit 21 from the reference voltage source 22, the comparison circuit 21 is caused to operate and its output signal resets the flip-flop 28 to zero. The gate 33 is cut off and the digital counter 34 terminates the measurement of the time interval between the moments at which the output voltage of the D.C. amplifier 15 proportional to the current through the resonant LC circuit alternately equals each of the two reference voltages $U_3$ and $U_4$. Besides, the output of the comparison circuit 21 resets the flip-flop 26 to the zero state and the flip-flop 27 to the I state, which reverts the circuit to its initial condition.

The magnitudes of the obtained and measured voltage U and time interval $t_o$ give unambiguous values of capacitance C of the capacitor 14 in the resonant LC circuit and inductance L in this circuit:

$$U = k \cdot R_o \cdot C;$$

$$t_o = (U_3 - U_4)/E_o \cdot R_o \cdot L$$

Another embodiment of the device for measuring the parameters of resonant LC circuit elements operates in a similar manner.

The only difference in the operation of the two embodiments is that due to the output of the switch I (FIG. 2) being connected to the input of the D.C. amplifier 15 through the resistor 37 with the resistance $R_o$ and also due to the connection of the inductance coil 35 in series with the capacitor 36 of the resonant LC circuit into the negative parallel feed-back circuit of the D.C. amplifier 15, this circuit receives linearly varying or constant current depending on the wave-form of the voltage across the output of the switch I, whereas the output voltage of the D.C. amplifier 15 is equal to the voltage taken off the inductance coil 35 connected in series with the capacitor 36 which make up a resonant LC circuit.

The magnitudes of the obtained and measured voltage U and time interval $t_o$ unambiguously determine the values of inductance L of the inductance coil 35 in the resonant LC circuit and capacitance C of the capacitor 36 in this circuit:

$$U = k \cdot L/R_o;$$

$$t_o = (U_3 - U_4) R_o/E_o \cdot C$$

The proposed method for measuring the parameters of elements in a resonant LC circuit and a device for realizing this method provide for fast measurements, a broad range of applications and a high measurement accuracy. When employed for measuring the parameters of individual LC elements and those of elements in a resonant LC circuit, the proposed method and device make it possible to improve the measurement accuracy by eliminating conversion errors caued by stray inductance in the capacitors and stray capacitance in the inductance coils.

The herein-disclosed method and device allow for reducing power dissipation in the resonant LC circuit which enables measurement of the parameters of thin-film LC elements and conversion of signals from LC microsensors into proportional digital pulses.

The device for measuring the parameters of resonant LC circuit elements is simple in design and has small dimensions.

Those skilled in the art may readily ascertain that the present device as described herein incorporates known components which have been disclosed in various publications, as follows:

Electronic gates 2, 3, 4, 5, 33 are illustrated, for example, in the drawings and described in "Electronic Analog and Hybird Computers" G. A. Korn et al., Vol. I, Theory and Main Functional Units, translated from English and published by Publishing House "MIR," Moscow, 1967, p. 302, FIG. 6.20c. This book on page 304 at lines 12–15 at bottom (Russian edition) teaches as follows: "FIG. 6.20e and f illustrate another circuit of series gate 99 wherein use is made of neutral connected transistors (their connection is neither normal nor inverse)."

Supply source 12 d–c and source 22 for reference voltages are shown in drawings and described in "Semiconductor Compensating Voltage and Current Stabilizers" V. I. Karpow, Second Edition, Publishing House "Energy," Moscow, 1967, p.99, FIG. 59. This book, on page 98 at lines 12–23 from the bottom, teaches the quality specifications and indicates that the stabilizer has high quality specifications at a relatively powerful output and the summary non-stability of its voltage does not exceed 0.03 per cent, i.e., has the same order that is proper to a normal element of class "III."

Calibrated interval timer 29 and interval timer 30 are shown in drawings and described in "Theory and Calculation of the Pulse semiconducting devices," L. M. Goldenberg, Publishing House "Svayz" Moscow, 1969, page 308, FIG. 5.17d. The publication, on page 310 at lines 4–11 from the top, teaches that "FIG. 5.17d illustrates a diagram of one version of the driven flip-flop wherein circuit $CR_b$ is substituted with pulse flip-flop"

and indicates the principles of operation of said flip-flop.

Figure 2:
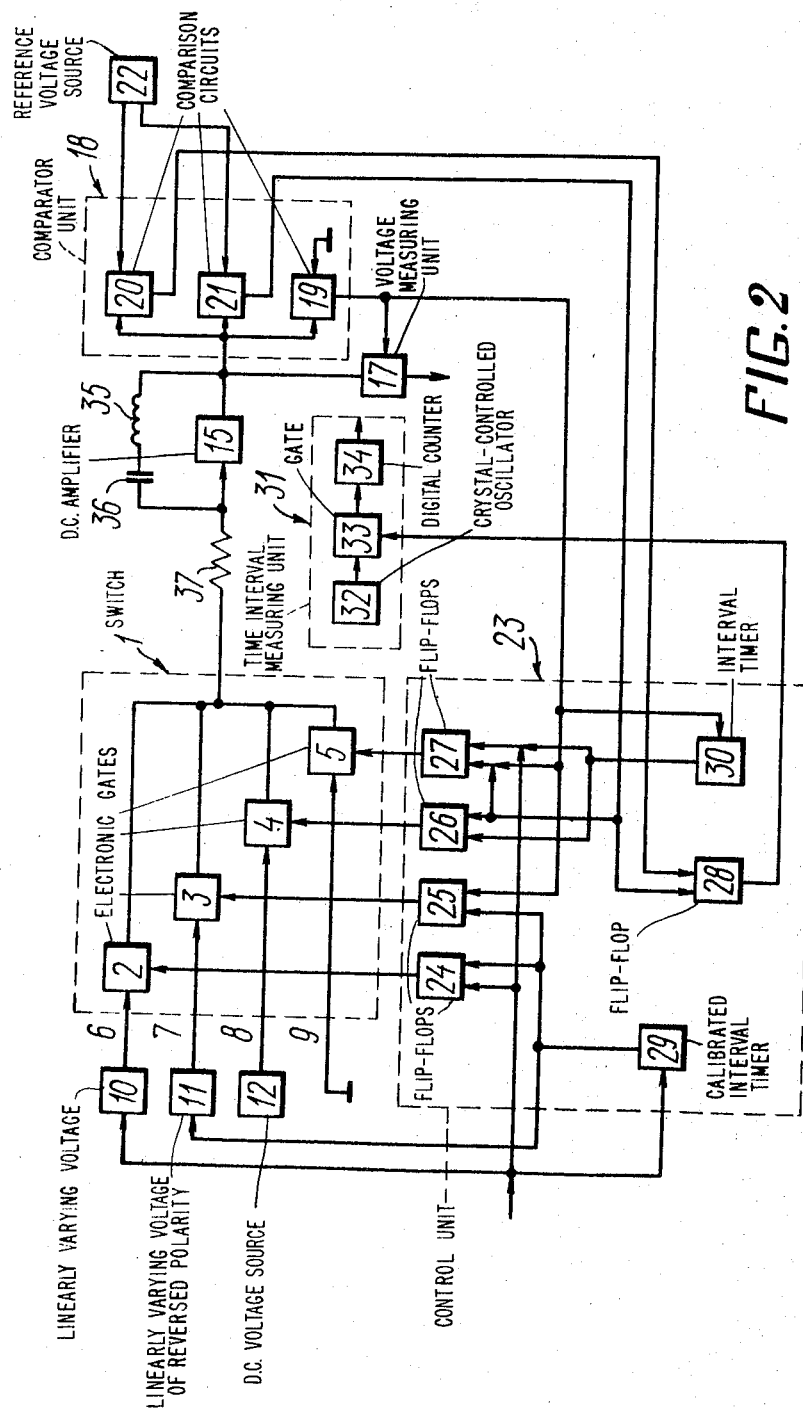
FIG. 2 is a functional diagram of another embodiment of the device, according to the present invention.

Comparison circuits 19, 20, 21 are shown in drawings and described in "Digital Measuring Converters and Instruments," V. M. Shlandin, Publishing House "High School," Moscow, 1973, prepared for printing Oct. 24, 1972, signed for printing Jan. 29, 1973, p.p. 104, 105, FIG. 2.34; 2.35. The publication, on page 104, lines 1–2 at the bottom teaches "A simple integral differential amplifier IYT221 (II2222) is illustrated in FIG. 2.34a." On page 105 at lines 9–10 from the top, the publication teaches "The diagram of comparison circuit by using two integral amplifiers IYT221 and integral trigger Schmidt Tg is illustrated in FIG. 2.34b." The same book on page 105 at lines 14–17 from the bottom teaches "FIG. 2.35 illustrates an integral differential amplifier 1YT401 which has the best characteristics." The book on page 105 at lines 1–3 at the bottom and page 106 at lines 1–2 at the top cites the parameters of comparison circuit by using one amplifier 1YT401 and one integral Schmidt trigger.

Crystal controlled oscillator 32 is illustrated in a drawing and described in "Transistorized Pulse Oscillators," V. N. Yakovlev, Second Edition, Publishing House "Technika," Kiev, 1968, p. 286, FIG. 151a. The book on page 285 at lines 9–14 from the top, teaches "The symmetrical flip-flop with a crystal-controlled resistor connected in parallel to one of the time-setting capacitors (FIG. 151a) in difference to the oscillatory circuit makes it possible to obtain the square oscillations with any on-off time rate $Q - 2$ besides uneven values. . . " The same book, on pages 285–292, describes in detail its principle of operation.

Digital counter 34 is shown in drawings and described in "Digital Indication," M. I. Lerner et al., Publishing House "Energy," Moscow, 1970, p. 30, FIG. 2-19. The book on page 31 at lines 4–11 from the top, describes that "The transistorized counter decades with display produced in series are made up according to the following diagrams: counter decade-decoder-matching device-digital display or counter decade-matching device-decoder-digital display. The counter decade with digital display type IH-1(FIG. 2-19) is cited as an example. The matching device of this decade is made up by using high voltage transistors IIII-$_1$–IIII$_8$ and the decoder is made up by using diodes."

Voltage measuring unit 17 is shown in drawings and described in "Digital Electric Measuring Instruments," V. M. Shlandin as editor, Publishing House "Energy," Moscow, 1972, FIG. 3-47, p.p. 151–152. The book on page 151 at lines 1–4 from the bottom, and page 152 at lines 1–3 from the top, teaches "In the USSR and some foreign countries the industry manufactures a series of digital volt-meters by using a method of time-pulse conversion with linear swept voltage. The digital voltmeter B7-8 (V.3-61; 3-89, 3-90) is a typical example of an instrument produced in the USSR. The setup diagrams and time patterns of its operation are illustrated in FIG. 3-47a, b." *The same book describes in detail the operation of the voltmeter.*

Linearly varying voltage source 10 is shown in a drawing and described in "Theory and Calculation of Pulse Semiconductor Devices," L. M. Goldenberg, Publishing House "Svyaz," Moscow, 1969, p. 393, FIG. 8.18. The publication, on page 392, lines 18–21 from the top, teaches "Instead of a separate regulated source in the current stabilizer a capacitor $C_F$ is used in the linearly increasing oscillator whose diagram is shown in FIG. 8.18a." The same book, on pages 392–394, discloses in detail the description of the diagram and the principle of operation of the oscillator.

Source 11 producing a linearly varying voltage of a reversed polarity is shown in a drawing and described in "Electronic Measuring Digital Readout Instruments", B. I. Shwedsky, Second edition, Publishing House "Technika," Kiev, 1970, p. 99. FIG. 35. The book on page 99 at lines 11–13 from the top (Russian edition), discloses "A linear voltage transistorized oscillator is illustrated in FIG. 35. The circuit is an amplifier in the mode of integration." The same book on pages 9–100 teaches in detail the description of the diagram and principle of operation of the oscillator.

What is claimed is:

1. A method for measuring the parameters of elements in a resonant LC circuit comprising the steps of applying a linearly varying voltage to a resonant LC circuit formed of parallel-connected elements; setting a calibrated time interval at the end of which said linearly varying voltage is cut off; applying a linearly varying voltage of a polarity opposite to that of the linearly varying voltage that has been previously applied; interrupting said linearly varying voltage at the instant when the current passing through the resonant LC circuit becomes almost nil; measuring the current flowing through the resonant LC circuit after the interruption of said linearly varying voltage; applying a D.C. voltage to the resonant LC circuit; comparing the current caused in the resonant LC circuit by said D.C. voltage with two reference currents; measuring the time interval between the instants at which said current flowing through the resonant LC circuit alternately equals each of said reference currents, respectively, the magnitude of the time interval together with said measured current being used for determining the parameters of the parallel-connected elements of the resonant LC circuit.

2. A method for measuring the parameters of elements in a resonant LC circuit comprising the steps of applying a linearly varying current to a resonant LC circuit formed of series-connected elements; setting a calibrated time interval at the end of which said linearly varying current is cut off; applying a linearly varying current of a direction opposite to that of the linearly varying current that has been previously applied; interrupting said linearly varying current at the instant when the voltage taken off the resonant LC circuit is almost nil; measuring the voltage taken off the resonant LC circuit after the interruption of said linearly varying current; applying direct current to the resonant LC circuit; comparing the voltage taken off the resonant LC circuit when said direct current is applied, with two reference voltages; measuring the time interval between the instants at which said voltage taken off the resonant LC circuit alternately equals each of said reference voltages, respectively, the magnitude of the time interval together with said measured voltage being used for determining the parameters of the series-connected elements of the resonant LC circuit.

3. A device for measuring the parameters of elements in a resonant LC circuit with parallel-connected elements, comprising a switch; a source of a linearly varying voltage connected to a first input of said switch and adapted to be turned on by an external signal; a source of a linearly varying voltage of a polarity opposite to that of said source connected to a second input of said switch and adapted to be turned on at the end of a calibrated time interval; a D.C. voltage source connected to a third input of said switch; a D.C. amplifier employing parallel negative feedback and connected through the resonant LC circuit to the output of said switch; a voltage measuring unit coupled to the output of said D.C. amplifier; a comparator unit also coupled to the output of said amplifier; a source of reference voltages connected to the input of said comparator unit; a control unit connected to the output of said comparator unit; a time interval measuring unit coupled to the output of said control unit; a voltage measuring unit also coupled to the output of said comparator unit which sends three signals to said voltage measuring unit and control unit at the instants when the output voltage of said D.C. amplifier alternately equals zero and each of the two reference voltages; said control unit which controls said time interval measuring unit so that the beginning of the measured time interval coincides with the second signal from said comparator unit, and the end, with the third signal from the comparator unit, and which also changes the state of said switch so that the output of said switch at the moment of the arrival of an external signal is connected to its first input, and after a calibrated time interval elapsing from the arrival of the external signal, the output of said switch is connected to its second input; said comparator unit whose first signal causes connection of the output of said switch to its fourth earthed input, while said voltage measuring unit starts to measure the voltage across the output of said D.C. amplifier, after the completion of which signal, the output of said switch is connected to its third input.

4. A device for measuring the parameters of elements in a resonant LC circuit with series-connected elements, comprising a switch, a source of a linearly varying voltage connected to a first input of said switch and adapted to be turned on by an external signal; a source of a linearly varying voltage of a polarity opposite to that of said source connected to a second input of said switch and adapted to be turned on at the end of a calibrated time interval; a D.C. voltage source connected to a third input of said switch; a D.C. amplifier employing parallel negative feedback and electrically coupled to the output of said switch; a reference element which accomplishes electric coupling between said switch and said D.C. amplifier; a voltage measuring unit connected to the output of said D.C. amplifier; a comparator unit also connected to the output of said amplifier; a source of reference voltages coupled to the input of said comparator unit; a control unit coupled to the output of said comparator unit; a time interval measuring unit connected to the output of said control unit; a voltage measuring unit also connected to the output of said comparator unit which sends three signals to said voltage measuring unit and control unit at the instants when the output voltage of said D.C. amplifier alternately equals zero and each of the two reference voltages; said control unit which controls said time interval measuring unit so that the beginning of the measured time interval coincides with the second signal from said comparator unit, and the end, with the third signal from said comparator unit, and which also changes the state of said switch so that at the moment of the arrival of an external signal the output of said switch is connected to its first input, and after a calibrated time interval elapsing from the arrival of the external signal, the output of said switch is connected to its second input; said comparator unit whose first signal causes connection of the output of said switch to its fourth earthed input, while said voltage measuring unit starts to measure the voltage across the output of said D.C. amplifier, after the completion of which signal the output of said switch is connected to its third input.

5. A device as claimed in claim 3, in which a resistor is included in the parallel negative feedback circuit of said D.C. amplifier.

6. A device as claimed in claim 4, in which series-placed LC elements are included in the parallel negative feedback circuit of said D.C. amplifier, and a resistor is used as a reference element.

* * * * *